(12) United States Patent
Peterson

(10) Patent No.: US 8,009,229 B1
(45) Date of Patent: Aug. 30, 2011

(54) HELMET SAFETY SYSTEM

(76) Inventor: Allen Peterson, Cincinnati, OH (US)

( * ) Notice: Subject to any disclaimer, the term of this patent is extended or adjusted under 35 U.S.C. 154(b) by 965 days.

(21) Appl. No.: 11/936,391

(22) Filed: Nov. 7, 2007

(51) Int. Cl.
*H04N 5/225* (2006.01)
*H04N 7/18* (2006.01)
*G09G 5/00* (2006.01)

(52) U.S. Cl. .............................. 348/376; 348/158; 345/8

(58) Field of Classification Search ................. 348/158, 348/376; 345/8, 9; 359/630; 2/6.6, 6.7
See application file for complete search history.

(56) References Cited

U.S. PATENT DOCUMENTS

| | | | |
|---|---|---|---|
| D448,015 S | 9/2001 | Lapalme | |
| 7,515,345 B2 * | 4/2009 | Heimer | 359/630 |
| 2003/0058544 A1 * | 3/2003 | Bianco et al. | 359/630 |
| 2003/0122958 A1 | 7/2003 | Olita et al. | |
| 2003/0163827 A1 * | 8/2003 | Purpura | 348/143 |
| 2006/0000010 A1 | 1/2006 | Halsnes et al. | |
| 2006/0048286 A1 | 3/2006 | Donato | |
| 2006/0072007 A1 | 4/2006 | Gilor | |
| 2006/0277664 A1 | 12/2006 | Akhtar et al. | |
| 2006/0277666 A1 | 12/2006 | Gertsch et al. | |
| 2009/0109286 A1 * | 4/2009 | Ennis | 345/8 |
| 2009/0109292 A1 * | 4/2009 | Ennis | 348/158 |
| 2010/0302356 A1 * | 12/2010 | Sinivaara | 345/8 |

* cited by examiner

*Primary Examiner* — Jason Whipkey

(57) ABSTRACT

The present invention discloses a helmet with a plurality of electronic safety devices. The safety devices of the present invention include an audio and video communication system. The video communication system features include a video camera system that can transmit images to a central location, and a display system that can display images transmitted via satellite on a unique heads up display located within the helmet's pivotal safety glasses. The helmet's pivotal safety glasses have a specially designed display that allows users to view images broadcasted to them without having the bulky designs and limited sight problems associated with the traditional display apparatuses of the prior art.

2 Claims, 3 Drawing Sheets

HELMET SAFETY SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to a helmet with built-in electronic safety features.

B. Discussion of the Prior Art

The Olita et al. patent application Publication (U.S. Pub. No. 2003/0122958) discloses a helmet mounted thermal imaging system that is designed to be mounted to a protective safety helmet. The thermal imaging camera of the Olita patent application has an eye piece display for viewing thermal images. The eye piece display hangs downward and is positioned on a large face shield. The present invention seeks to overcome the shortcomings of Olita patent application by using a "heads up" display system that has a projection area located within the specially design safety glasses. The safety glasses of the present invention are less obtrusive than the eye piece system of the Olita patent application.

The Halsnes et al. patent application Publication (U.S. Pub. No. 2006/0000010) discloses a helmet with a highly flexible construction that allows for various forms of protection. The various forms of protection that the Halsnes patent application provides encompasses multiple shields that provide different degrees of facial protection. The present invention differs from the Halsnes patent application because the present invention features multiple electronic safety devices integrated into a helmet, whereas, the Halsnes patent provides multiple degrees of safety protection through the use of pivotally connecting non-electronic safety devises.

The Donato patent application Publication (U.S. Pub. No. 2006/0048286) discloses a helmet for displaying environmental images in critical environments. The Donato patent features an externally mounted video camera coupled with a pull-down display. While the present invention also features a video camera and display system, the video camera of the present invention is mounted inside the helmet. The display system of the Donato patent is externally mounted and rests two to three inches away from the user's face. The present invention has a "heads up" display located within the specially designed safety glasses. The configuration of the present invention allows a rescue worker to operate in a limited space area without having to subject the display system to possible damage from foreign objects.

The Gilor patent application Publication (U.S. Pub. No. 2006/0072007) discloses a device system for mounting audio and video capturing systems to a helmet. The audio and video systems of the present invention are built into the helmet shell, whereas, the Gilor patent application discloses a system for retrofitting a helmet with electronic equipment.

The Akhatar et al patent application Publication (U.S. Pub. No. 2006/0277664) discloses a multifunctional helmet with a special voice communication system. The Akhatar patent differs from the present invention because the electronic devices only encompass a voice communication system, and that system is specifically designed for covert operations. The voice system of the present invention uses only a standard microphone and features a plurality of integrated electronic safety features.

The Gertsch et al. patent application Publication (U.S. Pub. No. 2006/027766) discloses a multifunctional electronic helmet. While the Gertsch Patent discloses a similar number of electronic safety devices as the present invention, it does not feature pivotal mounted safety glasses that have a heads up display device. The present invention provides a lighted display inside the safety glasses, which has the ability to have satellite transmitted images projected onto the display. This feature would be extremely beneficial for lost or trapped rescue workers. The Gertsch patent does not provide any type of display system within the helmet, it only provides transmission of images captured on the camera system.

The Lapalme Design patent (U.S. Patent. Des. No 448,015) discloses an ornamental design for a video camera head set. The design of the present invention features a video camera attached to a headset apparatus. The present invention differs from the Lapalme patent because its video camera system is mounted inside the helmet.

The "I-Vision" is a non-patent piece of prior art by Security International, that provides a night vision imaging system that can be adapted to any helmet. However, the I-Vision system cannot receive audio or video signals from a remote source, such as the present invention.

The Clip-On Night Vision is another non-patent piece of prior art by Special Operations Technology that is similar to the previously discussed "I-Vision."

The company helmetcamera.com has a plurality of helmet mounted camera kits that are available. However, these kits are mountable to any helmet, and do not include a drop-down display as does the present invention.

The unique pivotal display system of the present invention differs from all other prior art because its provides a safety feature that can provide trapped or lost workers with visual aids and/or other information transmitted through satellite communication to help rescue those in peril.

BRIEF SUMMARY OF THE INVENTION

The present invention discloses a helmet with a plurality of electronic safety devices. The safety devices of the present invention include an audio and video communication system. The video communication system includes a video camera system that can transmit images to a central location, and a display system that can display images transmitted via satellite on a unique heads up display located within the pivotal safety glasses of the helmet. The pivotal safety glasses of the helmet have a specially designed display that allows users to view images broadcasted to them without having the bulky designs and limited sight problems associated with the traditional display apparatuses of the prior art.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

Figure 1:
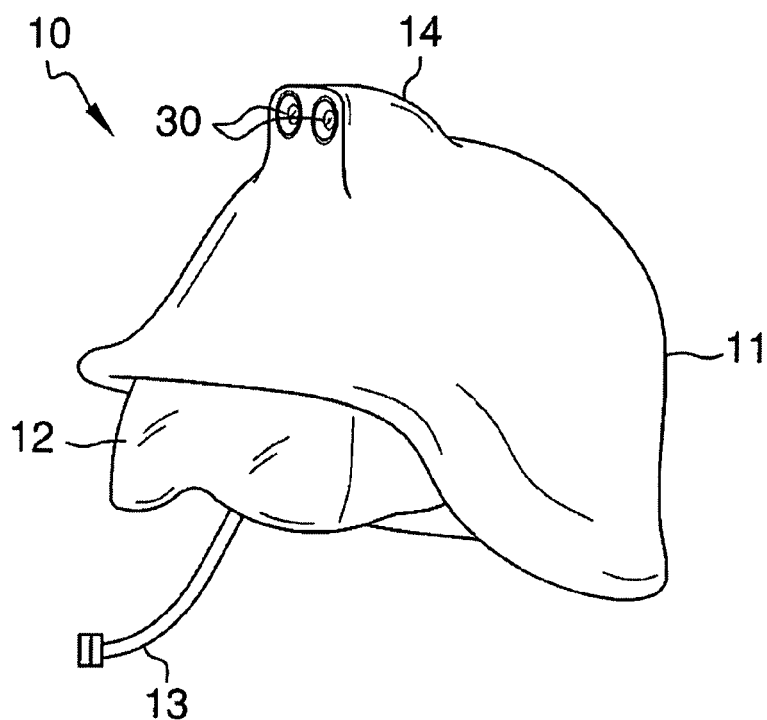
FIG. 1 illustrates an isometric view of the invention with the pivotally mounted safety glasses extended.
Figure 2:
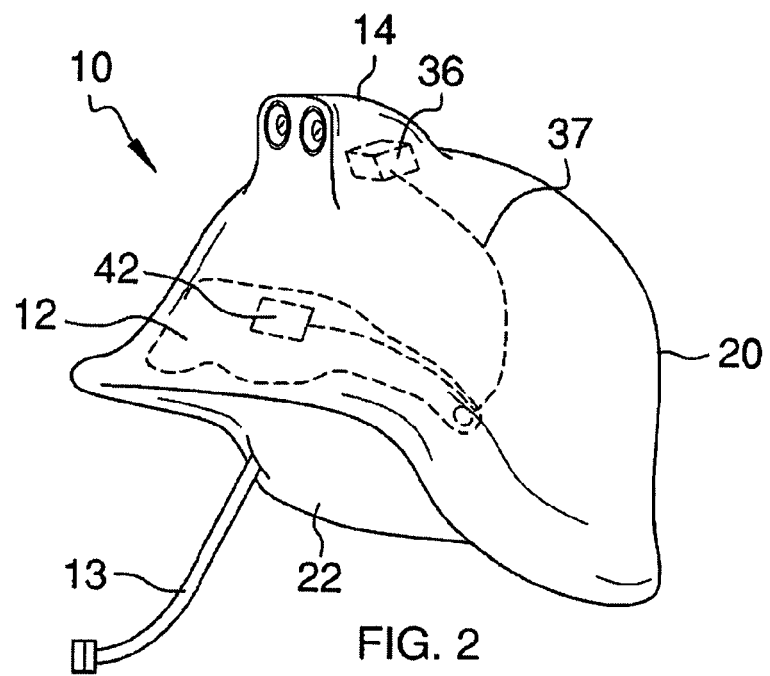
FIG. 2 illustrates an isometric view of the invention with hidden lines depicting the pivotally mounted safety glasses recessed in the helmet.
Figure 3:
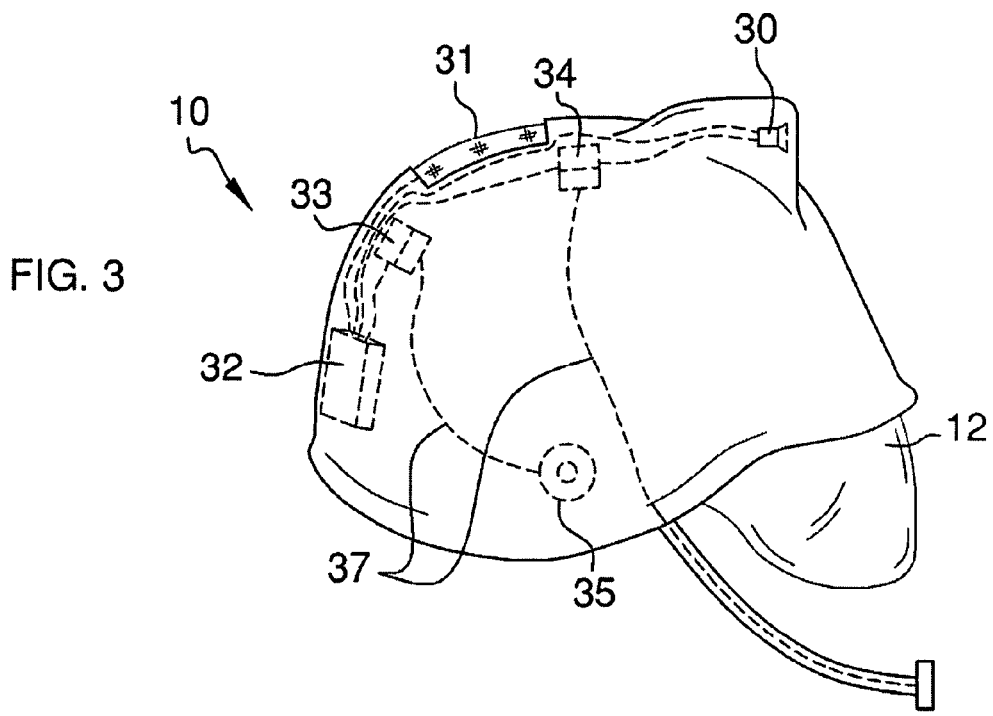
FIG. 3 illustrates a side view of the invention with hidden lines depicting the various electronic devices within the helmet.
Figure 4:
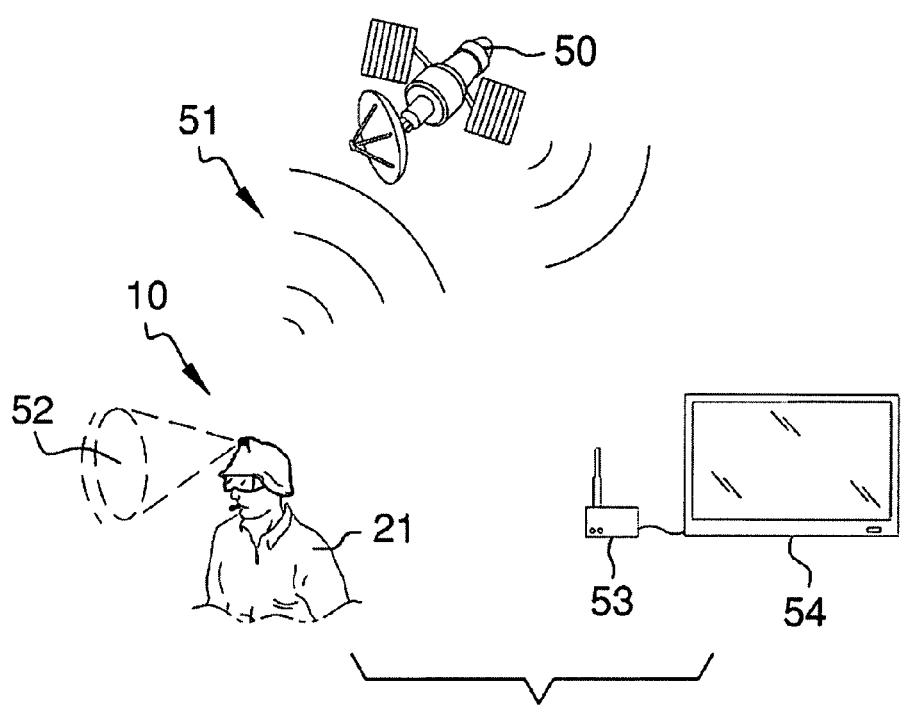
FIG. 4 illustrates a view of the invention in use.
Figure 5:
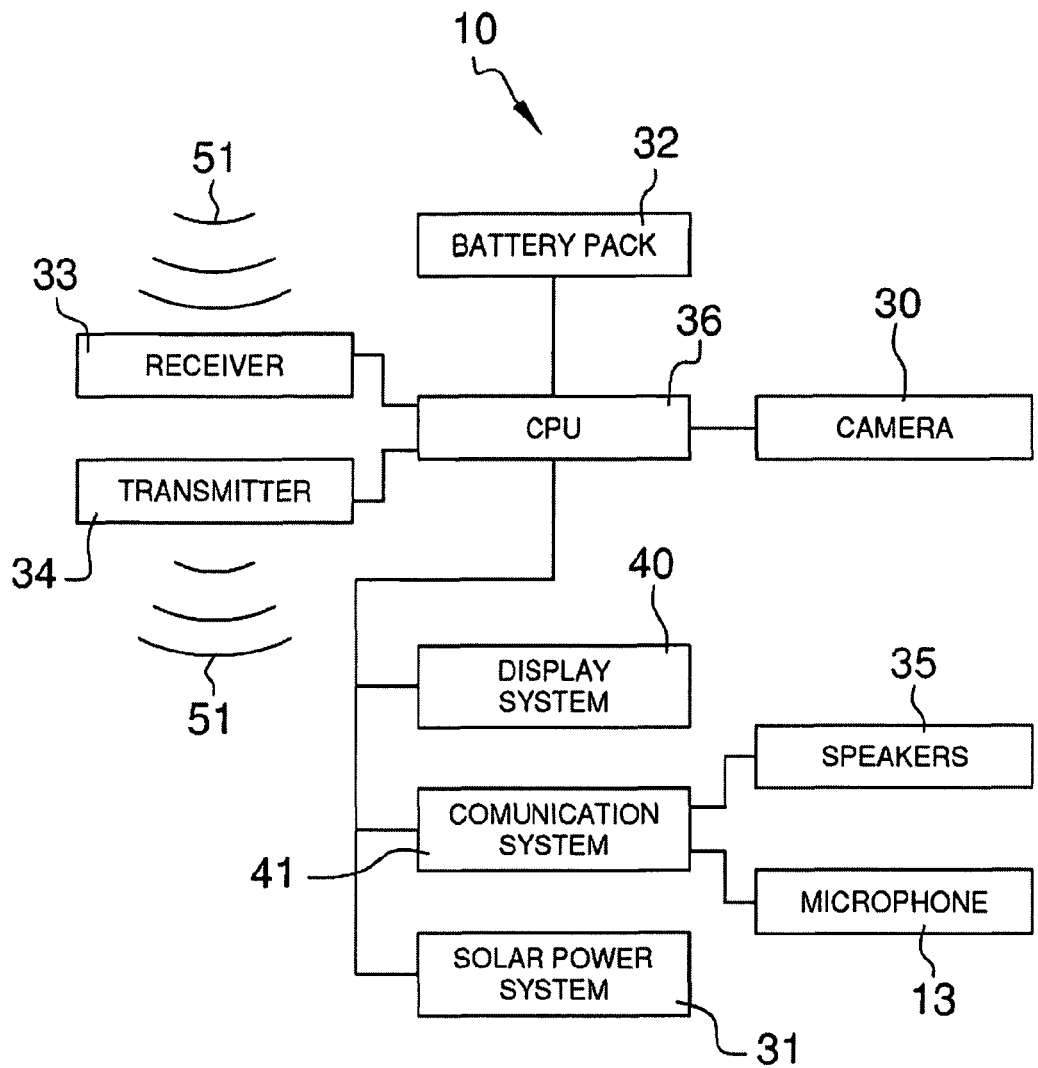
FIG. 5 illustrates an electrical diagram of the electrical system of the invention.

Detailed reference will now be made to the present invention, examples of which are illustrated in FIGS. 1-5. A safety helmet system 10 (hereinafter invention) consists of a helmet that has a pivotally mounted safety glass 12, a microphone 13, and a video camera mount 14.

The invention 10 has an outer shell 20 which is designed to provide protection for a person 21 from head injuries. The helmet also has an inner shell 22 which is designed to create a hollow cavity where a plurality of electronic devices are located. The pivotally mounted safety glasses 12 are mounted on the inner shell 22 of the invention 10.

It is being noted that the primary benefit of the invention 10 is the pivotally mounted safety glasses 12.

The outer shell 20 of the helmet 11 has a pair of video cameras 30 mounted on the bulged video camera mount 14. Behind the video camera mount 14, is a solar panel 31 that can provide an alternative power supply for the invention 10 in case a battery pack 32 becomes discharged.

Located within the hollow cavity of the invention 10 is a receiver 33, a satellite transmitter 34, a speaker 35, a CPU 36. The battery pack 32 and video cameras 30 are also located within the hollow cavity. All of the electronic devices are attached to each other through the use of wires 37 running inside of the hollow cavity of the invention 10.

The CPU 36 controls two systems, a display system 40, and a communication system 41. The communication system 41 consists of the internally mounted speakers 35, and the externally mounted microphone 13. The display system 40 consists of a display 42 located on the pivotally mounted safety glasses 12. The pivotally mounted safety glasses 12 have a display 42 which can project images from the CPU 36. These images can be from received from a communication satellite 50. This system could feature maps, charts, and even GPS coordinates.

One of the two video cameras 30 provides a telescopic camera lens that is projected onto the display 42. The other video camera 30 provides a video signal to the transmitter 35.

The receiver 33 receives signals from the communication satellite 50 via incoming signals 51 and transmits these incoming signals 51 to the CPU 36. The CPU 36 deciphers the incoming signals 51 and broadcasts them through either the speakers 35 or the display 42. Conversely, the transmitter 35 of the invention 10 transmits signals 51 captured from the video cameras 30 and/or the microphone 13 and sends the signals 51 to the communication satellite 50. The communication satellite 50 then sends these signals to an auxiliary transmitter/receiver apparatus 53. The auxiliary transmitter/receiver 53 can be attached to a computer 54 for audio and video communication.

It is envisioned that the invention 10 will provide an optical target device when used on the ground by a soldier, in which the video camera 30 will transmit a video signal via the transmitter 35 to the satellite. From the satellite, a signal can be transmitted to a pilot for use in ascertaining the target from the air.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A safety helmet comprising:
   (a) an outer shell;
      wherein the outer shell of the helmet has a solar panel;
      wherein a video camera mount is integrated into the outer shell; and
      wherein a plurality of video cameras are mounted into the video camera mount;
      wherein one of the video cameras has a telescopic camera lens;
      wherein one of the other video cameras is used to provide a video signal to a satellite;
   (b) an inner shell;
      wherein a pivotal microphone is attached to the inner shell;
      wherein pivotally-mounted safety glasses are attached to the inner shell;
      wherein the pivotally-mounted safety glasses can rotate up and down;
   (c) a hollow cavity;
      wherein the hollow cavity has a plurality of electronic components located within the hollow cavity;
   (d) electronic components;
      wherein the electronic components consist of a video display, a satellite receiver, a satellite transmitter, a battery pack, the video cameras, the solar panel, the microphone, and a pair of speakers;
      wherein the video display projects a video signal onto the pivotally-mounted safety glasses;
      wherein the electronic components are wired to and controlled by a CPU; and
      wherein the speakers are mounted to the interior surface of the inner shell.

2. The safety helmet as described in claim 1 wherein the safety helmet can provide on-the-ground reconnaissance from a ground soldier, and of which the video camera designated for a satellite can transmit a video signal to a satellite, and wherein the satellite can pass the video signal to a pilot for use in ascertaining a target from a plane.

* * * * *